(12) United States Patent
Lin et al.

(10) Patent No.: US 7,424,151 B2
(45) Date of Patent: Sep. 9, 2008

(54) METHOD AND SYSTEM FOR IMAGE CLASSIFICATION AND HALFTONE FREQUENCY DETECTION

(75) Inventors: Ying-Wei Lin, Penfield, NY (US); Shen-Ge Wang, Fairport, NY (US); Beilei Xu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 744 days.

(21) Appl. No.: 10/861,310

(22) Filed: Jun. 4, 2004

(65) Prior Publication Data

US 2005/0271277 A1 Dec. 8, 2005

(51) Int. Cl.
*G06K 9/34* (2006.01)
(52) U.S. Cl. .................. 382/173; 382/224; 375/240.2
(58) Field of Classification Search ............... 382/173
See application file for complete search history.

(56) References Cited

U.S. PATENT DOCUMENTS

| | | | | |
|---|---|---|---|---|
| 4,672,441 A | * | 6/1987 | Hoelzlwimmer et al. | 348/400.1 |
| 5,128,757 A | * | 7/1992 | Citta et al. | 375/240.01 |
| 5,187,755 A | * | 2/1993 | Aragaki | 382/239 |
| 5,341,226 A | | 8/1994 | Shiau | 358/518 |
| 5,416,613 A | | 5/1995 | Rolleston et al. | 358/518 |
| 5,687,303 A | | 11/1997 | Motamed et al. | 395/117 |
| 5,760,913 A | | 6/1998 | Falk | 358/298 |
| 5,765,029 A | | 6/1998 | Schweid et al. | 395/61 |
| 5,778,092 A | | 7/1998 | MacLeod et al. | 382/176 |
| 5,850,474 A | | 12/1998 | Fan et al. | 382/173 |

(Continued)

OTHER PUBLICATIONS

U.S. Appl. No. 10/604,200, filed Jun. 30, 2003, Reiner Eschbach et al.

(Continued)

*Primary Examiner*—Vikkram Bali
*Assistant Examiner*—David P Rashid
(74) *Attorney, Agent, or Firm*—Jeannette Walder

(57) ABSTRACT

A system and method for classifying an image block of a printed image into contone, halftone, or error diffusion classes, includes scanning the printed image; selecting an n by n block of pixels from the scanned image in a luminance channel; calculating an array of DCT coefficients of the pixel block, wherein the calculated DCT coefficients are representative of spatial frequency and spatial orientation of the pixel block; comparing the array of DCT coefficients with an array of predetermined values, wherein the array of predetermined values are indicative of contone, halftone and error diffusion classes; and determining the image classification of the pixel block based on the comparison of the DCT coefficients with the array of predetermined values. If the image is determined to be halftone, then the method further evaluates the DCT coefficients to determine the frequency of the halftone screen.

8 Claims, 4 Drawing Sheets
(2 of 4 Drawing Sheet(s) Filed in Color)

U.S. PATENT DOCUMENTS

| | | | | |
|---|---|---|---|---|
| 5,854,857 A | * | 12/1998 | de Queiroz et al. | 382/232 |
| 5,867,593 A | * | 2/1999 | Fukuda et al. | 382/176 |
| 5,907,362 A | * | 5/1999 | Yamamoto | 375/240.04 |
| 6,031,618 A | | 2/2000 | Wang | 356/419 |
| 6,069,973 A | | 5/2000 | Lin et al. | 382/167 |
| 6,091,767 A | * | 7/2000 | Westerman | 375/240 |
| 6,141,120 A | | 10/2000 | Falk | 358/504 |
| 6,175,650 B1 | * | 1/2001 | Sindhu et al. | 382/171 |
| 6,181,829 B1 | * | 1/2001 | Clark et al. | 382/273 |
| 6,252,994 B1 | * | 6/2001 | Nafarieh | 382/253 |
| 6,307,962 B1 | * | 10/2001 | Parker et al. | 382/170 |
| 6,353,675 B1 | | 3/2002 | Sharma | 383/141 |
| 6,493,387 B1 | * | 12/2002 | Shin et al. | 375/240.1 |
| 2002/0076103 A1 | | 6/2002 | Lin et al. | 382/173 |
| 2003/0072487 A1 | | 4/2003 | Fan et al. | 382/176 |

OTHER PUBLICATIONS

U.S. Appl. No. 10/604,201, filed Jun. 30, 2003, Gaurav Sharma et al.
Xerox, filed Jun. 4, 2004, Shen-ge Wang, et al.
Gaurav Sharma, Shen-Ge Wang, Deepthi Sidavanahalli, Keith Knox, "The Impact of UCR on Scanner Calibration", Proc. IS&T's 1998 PICS Conference, pp. 121-124.

* cited by examiner

| 183 | 160 | 94 | 153 | 194 | 163 | 132 | 165 |
| --- | --- | --- | --- | --- | --- | --- | --- |
| 183 | 153 | 116 | 176 | 187 | 166 | 130 | 169 |
| 179 | 168 | 171 | 182 | 179 | 170 | 131 | 167 |
| 177 | 177 | 179 | 177 | 179 | 165 | 131 | 167 |
| 178 | 178 | 179 | 176 | 182 | 164 | 130 | 171 |
| 179 | 153 | 180 | 179 | 183 | 169 | 132 | 169 |
| 177 | 173 | 180 | 179 | 187 | 170 | 129 | 174 |
| 180 | 179 | 181 | 179 | 181 | 170 | 131 | 169 |

*FIG. 1*

| 313 | 56 | -27 | 18 | 78 | -60 | 27 | -27 |
| --- | --- | --- | --- | --- | --- | --- | --- |
| -38 | -27 | 13 | 44 | 32 | -1 | -24 | -10 |
| -20 | -17 | 10 | 33 | 21 | -6 | -16 | -9 |
| -10 | -8 | 9 | 17 | -10 | -13 | 7 | 1 |
| -6 | 1 | 6 | 4 | -3 | -7 | -5 | 5 |
| 2 | 3 | 0 | -3 | -7 | -4 | 0 | 3 |
| 4 | 4 | -1 | -2 | -9 | 0 | 4 | 4 |
| 3 | 1 | 0 | -4 | -2 | -1 | 3 | 1 |

*FIG. 2*

METHOD AND SYSTEM FOR IMAGE CLASSIFICATION AND HALFTONE FREQUENCY DETECTION

CROSS-REFERENCE TO RELATED APPLICATIONS

This application is related to co-pending, co-assigned U.S. Pat. No. 6,941,014 to Lin et al. filed Dec. 15, 2000, for Method and Apparatus for Segmenting an Image Using a Combination of Image Segmentation Techniques; co-pending, co-assigned U.S. Pat. No. 6,973,213 to Fan et al. filed Oct. 12, 2001, for Background-Based Image Segmentation; co-pending, co-assigned U.S. application Ser. No. 10/604,200 to Eschbach et al. filed Jun. 30, 2003, for Systems and Methods for Estimating an Image Marking Process Using Scanned Image Attributes and Color Calibration Profiles ("D/A1366"); and co-pending, co-assigned U.S. application Ser. No. 10/604,201 to Sharma et al., filed Jun. 30, 2003, for Systems and Methods for Associating Color Profiles With a Scanned Input Image Using Spatial Attributes ("D/A1366Q"), the contents of all of which are incorporated herein by reference and made a part hereof.

FIELD OF THE INVENTION

This invention relates generally to methods of image classification, and more particularly to a method for determining whether an image type is contone, halftone or error diffusion, and if halftone, for determining the halftone frequency.

BACKGROUND OF THE INVENTION

Document image data resulting from scanning of a hardcopy document is often stored in the form of multiple scanlines, each scanline comprising multiple pixels. Document images generally contain multiple regions with each region exhibiting distinct properties. When processing this type of image data, it is helpful to know the type of image represented by the data. For example, the image data could represent graphics, text, a halftone, contone, or some other recognized image type. A page of image data could be all one type, or some combination of image types. To process document images containing multiple regions accurately, different algorithms should be applied to each type of region. For example, text regions need to be sharpened before being printed. However, halftone pictures need to be low-pass filtered first to avoid moiré. Therefore, a document image generally needs to be segmented into its constituent regions before image processing techniques can be applied most effectively.

It is known in the art to take a page of document image data and to separate the image data into windows of similar image types. For instance, a page of image data may include a halftoned picture with accompanying text describing the picture. In order to efficiently process the image data, it is known to separate the page of document image data into two windows, a first window representing the halftoned image, and a second window representing the text. Processing of the page of document image data can then be efficiently carried out by tailoring the processing to the type of image data being processed.

Traditional methods of document image segmentation, such as for example, U.S. Pat. No. 5,850,474 to Fan et al. for Apparatus and Method for Segmenting and Classifying Image Data, use heuristic rules to classify each pixel, then use connected component analysis to form "windows" of similar image types. D/A1159 describes an alternative approach, called the BISEG algorithm, where windows are generated by growing the "background". This method is applicable for document images where the "windows" are separated by a uniform background. To complete image segmentation, each window must be classified into contone or halftone, and if halftone the frequency of the halftone screen must be detected. Previous algorithms tend to be complicated, and difficult to implement. What is needed is a simple method for classifying an image as contone or halftone, and if halftone, determining the halftone frequency.

SUMMARY OF THE INVENTION

A system and method for classifying an image block of a printed image into contone, halftone, or error diffusion classes uses JPEG/DCT (Discrete Cosine Transform) of a pixel block. The system and method of the invention uses the fact that, in most scanning systems, a large amount of data will be described in the form of JPEG compressed data. The DCT coefficients are compared with an array of predetermined values, which are indicative of contone, halftone and error diffusion classes to classify the pixel block. If the block is determined to be halftone, the system and method uses the DCT coefficients to determine the halftone frequency of the screen. The DCT coefficients may be sampled to a set of features and a neural network used to compare the feature set with the array of predetermined values. Then a fraction of the blocks in a window may be polled for window classification. This method, when combined with automatic windowing methods such as Biseg, can yield accurate document image segmentation results, and is simple and economic to implement.

A system for classifying an image block of a printed image into contone, halftone, or error diffusion classes, according to the invention, includes a scanner scanning the printed image; a memory for storing the scanned image and for storing an array of predetermined values are indicative of contone, halftone and error diffusion classes; and a processor for selecting an n by n block of pixels from the scanned image in a luminance channel (RGB values may be easily converted to Lab values), for calculating an array of DCT coefficients of the pixel block, wherein the calculated DCT coefficients are representative of spatial frequency and spatial orientation of the pixel block, for comparing the array of DCT coefficients with an array of predetermined values, wherein the array of predetermined values are indicative of contone, halftone and error diffusion classes, and for determining the image classification of the pixel block based on the comparison of the DCT coefficients with the array of predetermined values.

A method for classifying an image block of a printed image into contone, halftone, or error diffusion classes, according to an aspect of the invention, includes scanning the printed image; selecting an n by n block of pixels from the scanned image; calculating an array of DCT coefficients of the pixel block, wherein the calculated DCT coefficients are representative of spatial frequency and spatial orientation of the pixel block; inputting the array of DCT coefficients into a classifier which has been configured to classify printed images into contone, halftone and error diffusion classifications using DCT coefficients; and determining whether the image classification of the pixel block is contone, halftone or error diffusion based on input DCT coefficients.

A method for classifying an image block of a printed image into contone, halftone, or error diffusion classes, according to another aspect of the invention, includes scanning the printed image; selecting an n by n block of pixels from the scanned image in a luminance channel; calculating an array of DCT coefficients of the pixel block, wherein the calculated DCT coefficients are representative of spatial frequency and spatial orientation of the pixel block; comparing the array of DCT coefficients with an array of predetermined values, wherein the array of predetermined values are indicative of contone, halftone and error diffusion classes; and determining whether the image classification of the pixel block is contone, halftone or error diffusion based on the comparison of the DCT coefficients with the array of predetermined values.

The method may further include sampling the array of DCT coefficients to produce a feature set of the pixel block; and comparing the feature set with the array of predetermined values to determine the image classification of the pixel block. In accordance with an aspect of the invention, the sampling step may include grouping the array of DCT coefficients into a DC term, segments of DCT coefficients having similar radial spatial frequencies, and segments of DCT coefficients having similar spatial orientations; and for each segment, calculating a sum of absolute values of all DCT coefficient in the segment to produce a feature of the pixel block, wherein the feature set includes the DC term and all segments features.

A neural network may be used to compare the DCT coefficients (or feature set values) with the array of predetermined values to determine whether the image is halftone, contone or error diffusion. The array of predetermined values may be determined by training the system with known examples of printed images or through heuristic design.

If the image classification is determined to be halftone, the system compares the array of DCT coefficients with a second array of predetermined values, wherein the second array of predetermined values are indicative of halftone frequency, and determines the halftone frequency of the pixel block based on the comparison of the DCT coefficients with the second array of predetermined values.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 1 is an array of an exemplary 8 by 8 pixel array from an input image;

FIG. 2 is the DCT array corresponding to the input image of FIG. 1;

DETAILED DESCRIPTION OF THE EMBODIMENTS

Figure 3:
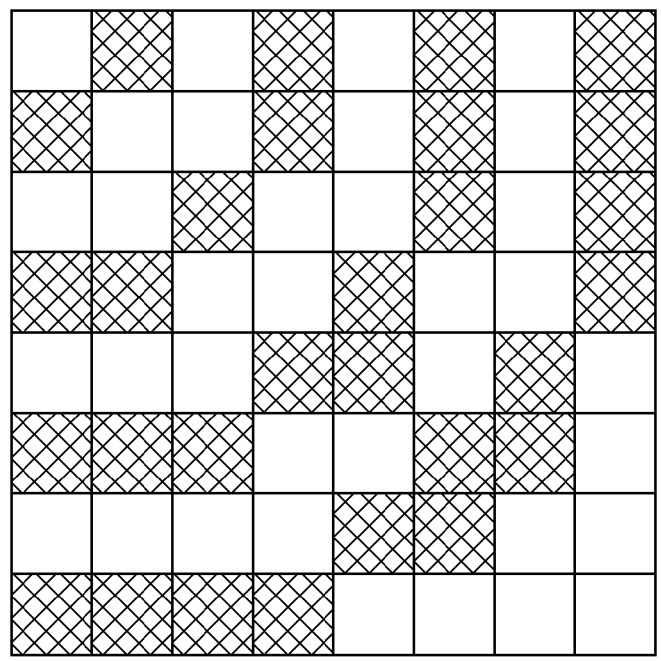
FIG. 3 illustrates sampling a DCT array of an 8 by 8 pixel block using the luminance channel to form a feature set.

A method of image classification analyzes the image through the Discrete Cosine Transform (DCT). (Details for the transform and its motivation may be found, for instance, in *Orthogonal Transforms for Digital Signal Processing*, by N. Ahmed and K. R. Rao). The following description is based on standard JPEG compressed data using 8 by 8 pixel blocks, but an extension to any base size (e.g., a pixel block of size n by n) or larger base sizes, e.g., 16 by 16 blocks is straightforward.

JPEG is the image compression standard developed by the Joint Photographic Experts Group. JPEG compression compresses gray scale images as well as color images. JPEG can compress the red-green-blue components of a color image as three separate gray scale images. The JPEG process divides an input image into 8 by 8 pixel blocks and then computes the discrete cosine transform (DCT) of each block (this results in a matrix of 64 coefficients). A quantizer is used to round off the DCT coefficients according to the quantization matrix. Finally, an encoder is used to output the quantized coefficients to an output file (the compressed image).

The discrete cosine transform (DCT) helps separate the image into parts (or spectral sub-bands) of differing importance with respect to the image's visual quality. The DCT is similar and closely related to the discrete Fourier transform; it transforms a signal or image from the spatial domain to the frequency domain. With an input image, f, the coefficients for the output "image" F, are calculated according to the following equation:

$$F(k_1, k_2) = C \sum_{n_1=0}^{7} \sum_{n_2=0}^{7} f(n_1, n_2) \cos\left[\frac{\pi(2n_1+1)k_1}{16}\right] \cos\left[\frac{\pi(2n_2+1)k_2}{16}\right].$$

The input image f is 8 pixels wide by 8 pixels high; $f(n_1, n_2)$ is the intensity of the pixel in row $n_1$ and column $n_2$. $F(k_1, k_2)$ is the DCT coefficient in row $k_1$ and column $k_2$ of the DCT array. All DCT multiplications are real. The DCT input is an 8 by 8 array of integers. This array contains each pixel's gray scale level. 8 bit pixels have levels from 0 to 255. The output array of DCT coefficients contains integers which can range from −1024 to 1023. For most images, much of the signal energy lies at low frequencies, which appear in the upper left corner of the DCT. As one moves to the right from the upper left corner, the corresponding coefficients represent increasing horizontally oriented frequencies, and as one moves lower from the upper-left corner the corresponding coefficients represent increasing vertically oriented frequencies. The lower right corner values represent highest frequency magnitudes.

A selected input image is scanned and an 8 by 8 pixel block from the scanned image selected for analysis. FIG. 1 is an exemplary 8 by 8 pixel block and FIG. 2 is the DCT array of normalized output corresponding to the DCT coefficients. Referring to FIG. 2, the first element (=313) of the 8 by 8 output block is the DC term and the other elements represent the cosine transforms with different spatial frequencies and different spatial orientations. The horizontal direction represents increasing frequency in the horizontal direction from left to right and the vertical direction represents increasing frequency in the vertical direction from top to bottom. The value of each cell represents the cosine transform of the corresponding frequency component in the input block.

The array of DCT coefficients can be compared to an array of predetermined values corresponding to the different image classes: contone, halftone and error diffusion to determine the image class. However, instead of providing these coefficients directly to a classifier, we propose further sampling of the DCT output to generate a smaller feature space for classification. The proposed sampling method is illustrated in FIG. 3. An advantage of this approach is that the structure of the classifier is highly regular, hence is easy to describe and implement. The small number of features makes this approach quite economical.

The classification method can be divided into two steps. In the first step, a block is classified into contone/clustered dot halftone/other. The "other" class could be error diffusion. For this task, only the luminance channel is used. The image is divided into 8 by 8 pixel blocks, and the DCT of each 8 by 8 block is computed. An 8 by 8 array illustrating the DCT coefficients is shown in FIG. 3. Then the absolute value of the coefficients in a "ring" is summed, see FIG. 3. In FIG. 3, the alternating black and white areas form the 8 rings.

There are 8 rings, giving 8 features. These features are then used as input to a simple neural network, with 8 input, ~4 hidden nodes, and 3 output. The details of neural-networkbased classifier are well known and can be found in many publications, e.g., "*Practical Neural Network Recipes in C++*", by Timothy Masters.

A sample test result is shown in Table 1. From the result, we see that the classification accuracy is quite high, and the classifier is quite robust against image degradations.

TABLE 1

Contone/halftone Classification Results

| | % blocks correctly classified | | | |
|---|---|---|---|---|
| | orig | blur | noise | sharp |
| Halftone (1751 pi) | 95 | 91 | 99 | 99 |
| Contone | 95 | 97 | 70 | 82 |

Note that the results represent the probability that each block is classified correctly. To classify a window, we need to poll the blocks in a window, and decide on the "winner". Since the block classification accuracy is high, only a small number of blocks need to be polled. This can result in very significant reduction in the computation load in a software implementation.

For image rendering purposes, the frequency of the clustered dot halftone is then detected using another neural network that has been trained for this task. For practical applications, classifying the frequency into one of 6 bands is adequate. If finer classification is needed, more classes can be used. Again, only the luminance channel is used, 8 by 8 block DCT computed, the absolute value of the coefficients in a ring summed, forming 8 features. For improved frequency detection accuracy, a 16 by 16 block DCT can be used, generating 16 features. Sample halftone frequency test results using 16 by 16 block are given in Table 2.

TABLE 2 halftone frequency classification results.

| | % blocks correctly classified | | | |
|---|---|---|---|---|
| Ht freq | orig | blur | noise | sharp |
| 85 | 85 | 86 | 76 | 73 |
| 133 | 89 | 88 | 83 | 87 |
| 175 | 82 | 75 | 75 | 78 |

Again, only a fraction of the blocks in a window needs to be polled. From the result, we see that the halftone frequency classification accuracy is high, and the classifier is quite robust against image degradations.

The arrays of predetermined values used to determine halftone, contone and error diffusion may be determined by training the system. The system is trained by computing the DCT coefficients for a large number of known images.

Figure 6:
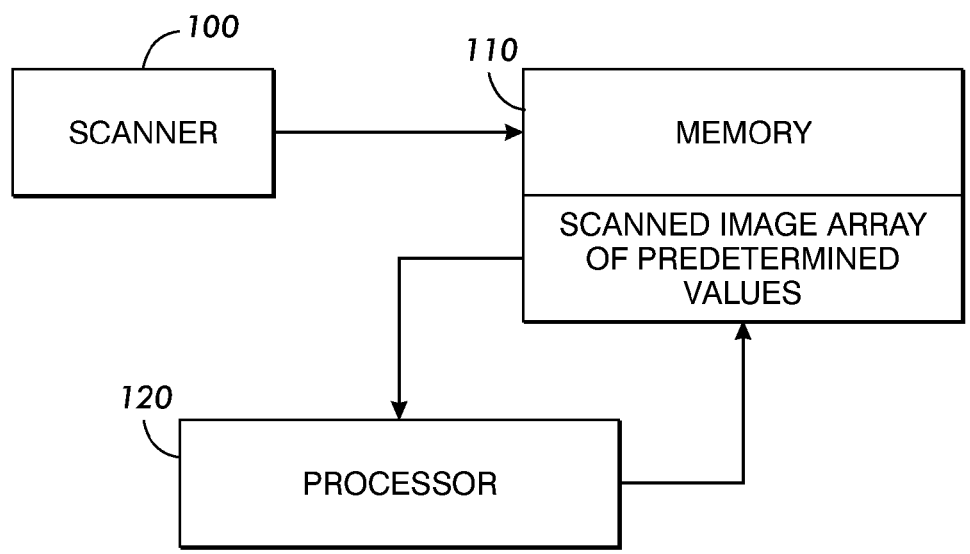
FIG. 6 is a block diagram of a system for classifying scanned media.

Referring to FIG. 6, a block diagram of a system for automatically classifying an image is shown. The system includes a scanner 100 for scanning the printed image. The scanned image is stored in memory 110. Also stored in memory 110 are the array of predetermined values indicative of the different image classes. A processor 120 selects an n by n block of pixels from the scanned image stored in memory 110, calculates an array of DCT coefficients of the pixel block, compares the array of DCT coefficients with the array of predetermined values, and based on the comparison, determines whether the pixel block is contone, halftone or error diffusion. If halftone, the system may further determine the frequency of the halftone screen.

The system and method of the invention may be applied to determine the class of a window of an image. The DCT coefficients of the pixel blocks in the window are computed. Note that only the features of the luminance channel are used. The DCT coefficients are sampled and the absolute values of selected DCT coefficients are summed to form feature vectors. The classifier first classifies each pixel block into contone/clustered dot halftone/other or error diffusion. Then a fraction of the pixel blocks are polled to determine the class of the window. If the class is determined to be clustered halftone, the classifier then determines the frequency of the window, by classifying its frequency into one of several bands. Frequency of each pixel block is determined and a fraction of the pixel blocks polled to determine frequency of the window.

A neural network may be used to input the DCT coefficients or feature set and compare them with the array of predetermined values indicative of halftone, contone or error diffusion. This facilitates computation. A second neural network may be used to determine the frequency (in bands) of the halftone screen. A second array of predetermined values indicative of the ranges of frequencies is compared in the second neural network with the DCT coefficients or feature set.

Figure 4:
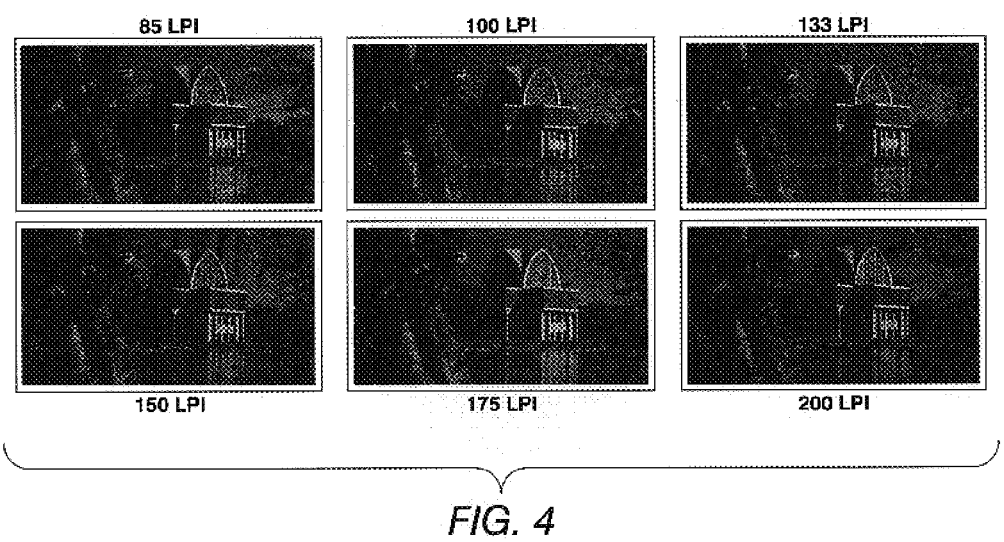
FIG. 4 illustrates six original halftone images with different halftone screen frequency.
Figure 5:
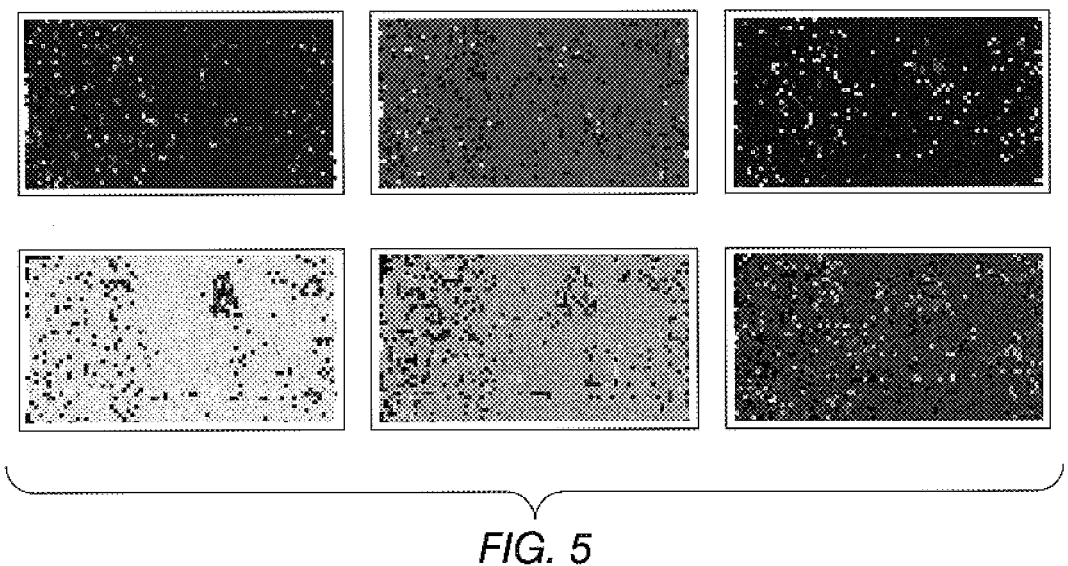
FIG. 5 illustrates the results of applying the classifier in combination with windowing.

An example, where the proposed image classification method is combined with the Biseg windowing method, is shown in FIG. 4 and FIG. 5. FIG. 4 illustrates six original images which were printed using halftone screens of 85 LPI, 100 LPI, 133 LPI, 150 LPI, 175 LPI and 200 LPI. FIGS. 4-5 shows the classification result using windowing. The windowing and block classification result is quite satisfactory. There should be no difficulty in making the correct window classification.

Since DCT-based JPEG is widely used for image compression, which is an essential part for digital scanners, hardware or software implementations of DCT are already available in image paths for many scanners. The proposed approach may provide a very practical solution for automatic scanned-media identification. Since only the luminance channel is used, the system and method provides computational efficiencies. All or part of the DCT computations may be performed as a precursor to compression of the image and need not be separately computed.

While this invention has been described with reference to a color scanner, the invention is not limited to such an embodiment. The invention may be applied to scanned image data captured at a remote location or to image data captured from a hard copy reproduction by a device other than a scanner, for example a digital camera. The invention may be practiced on any color reproduction device, such as, for example a color photocopier, and is also not intended to be limited to the particular colors described above.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for classifying an image block of a printed image into contone, halftone, or error diffusion classes, comprising:

scanning the printed image;
selecting an n by n block of pixels from the scanned image;
calculating an array of DCT coefficients of the pixel block, wherein the calculated DCT coefficients are representative of spatial frequency and spatial orientation of the pixel block;
inputting the array of DCT coefficients into a classifier which has been configured to classify printed images into contone, halftone and error diffusion classifications using DCT coefficients; and
wherein inputting the array of DCT coefficients into a classifier comprises comparing the array of DCT coefficients with an array of predetermined values, wherein the array of predetermined values are indicative of contone, halftone and error diffusion classes;
grouping the array of DCT coefficients into a DC term, segments of DCT coefficients having similar radial spatial frequencies, and segments of DCT coefficients having similar spatial orientations;
for each segment, calculating a sum of absolute values of all DCT coefficients in the segment to produce a feature of the pixel block, wherein the feature set includes the DC term and all segments features;
comparing the feature set with the array of predetermined values to determine the image classification of the pixel block; wherein n=8 and the feature set compares the DC term, 7 spatial frequency terms and 5 spatial orientation terms; and
determining whether the image classification of the pixel block is contone, halftone or error diffusion based on input DCT coefficients.

2. The method of claim 1, wherein the comparing step comprises inputting the feature set and the array of predetermined values to a neural network.

3. The method of claim 2, further comprising training the neural network with known examples of printed images.

4. The method of claim 1, wherein if the image classification is determined to be halftone, and further comprising:
comparing the array of DCT coefficients with a second array of predetermined values, wherein the array of predetermined values are indicative of halftone frequency; and
determining the halftone frequency of the pixel block based on the comparison of the DCT coefficients with the second array of predetermined values.

5. A method for classifying a printed image into contone, halftone, or error diffusion classes, comprising:
scanning the printed image;
segmenting the scanned image into at least one window, wherein the window comprises a plurality of n by n blocks of pixels from the scanned image in a luminance channel; and
for each n by n block of pixels in the window:
calculating an array of DCT coefficients of the pixel block, wherein the calculated DCT coefficients are representative of spatial frequency and spatial orientation of the pixel block;
grouping the array of DCT coefficients into a DC term, segments of DCT coefficients having similar radial spatial frequencies, and segments of DCT coefficients having similar spatial orientations; and
for each segment, calculating a sum of absolute values of all DCT coefficients in the segment to produce a feature of the pixel block, wherein n=8 and the feature set comprises a DC term, 7 spatial frequency terms and 5 spatial orientation terms;
comparing the feature set with an array of predetermined values, wherein the array of predetermined values are indicative of contone, halftone and error diffusion classes;
determining the image classification of the pixel block based on the comparison of the DCT coefficients with the array of predetermined values; and
polling the image classification of the pixel blocks in the window to determine the image classification of the window.

6. A system for classifying an image block of a printed image into contone, halftone, or error diffusion classes, comprising:
a scanner scanning the printed image;
a memory for storing the scanned image and for storing an array of predetermined values are indicative of contone, halftone and error diffusion classes; and
a processor for selecting an n by n block of pixels from the scanned image in a luminance channel, for calculating an array of DCT coefficients of the pixel block, wherein the calculated DCT coefficients are representative of spatial frequency and spatial orientation of the pixel block, for grouping the array of DCT coefficients into a DC term, segments of DCT coefficients having similar radial spatial frequencies, and segments of DCT coefficients having similar spatial orientations, for each segment, calculating a sum of absolute values of all DCT coefficients in the segment to produce a feature of the pixel block, wherein n=8 and the feature set comprises a DC term, 7 spatial frequency terms and 5 spatial orientation terms, for comparing the feature set with an array of predetermined values, wherein the array of predetermined values are indicative of contone, halftone and error diffusion classes, and for determining the image classification of the pixel block based on the comparison of the DCT coefficients with the array of predetermined values.

7. The system of claim 6, wherein if the image classification is determined to be halftone, the processor compares the array of DCT coefficients with a second array of predetermined values, wherein the array of predetermined values are indicative of halftone frequency; and determines the halftone frequency of the pixel block based on the comparison of the DCT coefficients with the second array of predetermined values.

8. The system of claim 6, wherein the processor segments the scanned image into at least one window, wherein the window comprises a plurality of n by n blocks of pixels from the scanned image in a luminance channel; and for each n by n block of pixels in the window, the processor calculates an array of DCT coefficients of the pixel block, wherein the calculated DCT coefficients are representative of spatial frequency and spatial orientation of the pixel block; compares the array of DCT coefficients with an array of predetermined values, wherein the array of predetermined values are indicative of contone, halftone and error diffusion classes; and determines the image classification of the pixel block based on the comparison of the DCT coefficients with the array of predetermined values; and polls the image classification of the pixel blocks in the window to determine the image classification of the window.

* * * * *